United States Patent [19]

Brewer

[11] Patent Number: 5,307,854
[45] Date of Patent: May 3, 1994

[54] TIRE BUFFING APPARATUS

[75] Inventor: Donaldee Brewer, Muscatine, Iowa

[73] Assignee: Bandag Licensing Corporation, Muscatine, Iowa

[21] Appl. No.: 21,726

[22] Filed: Feb. 22, 1993

Related U.S. Application Data

[63] Continuation of Ser. No. 757,736, Sep. 11, 1991, abandoned.

[51] Int. Cl.$^5$ ............................................. B29D 30/68
[52] U.S. Cl. ...................................................... 157/13
[58] Field of Search .............. 157/13; 51/33 W, 33 R, 51/51, 99, 106 R, DIG. 33, 165 R, 165.72, 124 L, 124 LG; 29/78

[56] References Cited

U.S. PATENT DOCUMENTS

| | | |
|---|---|---|
| 1,827,637 | 10/1931 | Andrews . |
| 2,633,675 | 4/1953 | Ellis .................................... 51/124 L |
| 2,864,445 | 12/1958 | Hawkinson ............................ 157/13 |
| 3,623,469 | 11/1971 | Niles . |
| 3,835,591 | 9/1974 | Cimprich . |
| 3,867,792 | 2/1975 | Pelletier . |
| 3,877,506 | 4/1975 | Mattox et al. . |
| 3,965,959 | 6/1976 | Weir . |
| 4,116,256 | 9/1978 | Morris et al. . |
| 4,679,358 | 7/1987 | Sieradzki ........................... 51/165.72 |
| 4,693,038 | 9/1987 | Vetter ............................... 51/165.72 |
| 4,723,376 | 2/1988 | Blum et al. ........................ 51/165.72 |

Primary Examiner—D. S. Meislin
Attorney, Agent, or Firm—Foley & Lardner

[57] ABSTRACT

The present invention involves a tire buffing apparatus. A rasping or buffing element is mounted in a manner which allows a compound radius to be formed in the shoulder of the tire casing without removing the rasp from the surface of the tire casing during the buffing operation. A tire casing rotating assembly includes a system for mounting the tire casing and rotating the casing. A pedestal is movable toward and away from the rotating tire casing. The pedestal is pivotable about the central axis of the pedestal and rotatable over a predetermined arc about a vertical axis spaced from the central axis of the pedestal. A rasp is mounted rearwardly and offset from the central axis of the pedestal.

6 Claims, 5 Drawing Sheets

TIRE BUFFING APPARATUS

This is a continuation of application Ser. No. 07/757,736 filed Sep. 11, 1991 abandoned.

TECHNICAL FIELD

The present invention generally relates to machines used in retreading tires, and in particular relates to a device useful in removing tread from the worn tire carcass prior to retreading.

BACKGROUND OF THE INVENTION

In general, devices for removing the tread of worn tires, commonly referred to as buffers or raspers, are known. See, for example, Pelletier, U.S. Pat. No. 3,867,792, issued Feb. 25, 1975; Mattox et al., U.S. Pat. No. 3,877,506, issued Apr. 15, 1975; Weir, U.S. Pat. No. 3,965,959, issued Jun. 29, 1976; and Morris et al., U.S. Pat. No. 4,116,256, issued Sep. 26, 1978.

Tire buffing is part of the tire retreading procedure. Typically, the tire casing to be retreaded is buffed to remove excess rubber, to provide a substantially evenly textured crown for receiving a cured tread strip and to provide a predetermined shoulder profile.

Tire casings usually include a belt package (a package of steel belts or cables) underlying the road engaging surface (e.g., the original tread) of the tire. Prior to retreading, the casing must be buffed, generally to a predetermined characteristic crown radius corresponding to the upper contour of the belt package. The casing is buffed to leave only a predetermined thickness, e.g. 3/32 of an inch, of material remaining over the top belt. The shoulder of the casing is also buffed (trimmed) to eliminate or reduce voids or patterns in the shoulder created by the original tread, and to provide a relatively straight profile between the casing side walls and the crown. A worn casing from each of the various models and sizes of new tires has a characteristic crown width, crown buffing radius and shoulder trim angle which must be created as an initial step in the buffing process.

A suitable layer of bonding material, such as uncured cushion gum, optionally including a low temperature vulcanizing agent and accelerator, is placed over the crown, then a cured tread strip, typically of a width corresponding to the width of the crown of the casing is cut to the length corresponding to the casing circumference and is disposed over the casing crown. Alternatively, continuous replacement treads in the shape of a ring (i.e., ring treads) have also been used to retread the buffed casing. A roller pressing process, commonly referred to as stitching, is next performed on the assembly to force air from between the tread strip and casing. The assembly is then subjected to heat and pressure, generally in an autoclave, to cure the bonding layer.

In the process of retreading tire casings with cured treads utilizing a cushion gum binder in a low temperature process, the face of the casing which receives the replacement tread can be buffed to a predetermined crown radius within a relatively small tolerance. Additionally, with the advent of new replacement tread designs, such as the contoured replacement tread disclosed in U.S patent application Ser. No. 07/634,421, filed Dec. 27, 1990, and owned by the assignee of this application, it is also necessary to ensure that the shoulder radius is also buffed precisely to a predetermined arc or radius. Known buffing machines do not permit highly controlled buffing of the compound radius in an efficient manner.

In particular, known devices cannot easily be used to buff a worn casing to a compound radius. In normal operation of one known device, the rasp is moved into contact with a rotating tire. As the rasp removes the worn tread, it is moved back and forth across the crown surface of the tread. Once a sufficient amount of rubber has been removed, i.e., until about 3/32 of rubber remains above the cords, the rasping is halted. The rasp is then pivoted with respect to the casing so that the rasp can be moved into contact with a first shoulder of the tire carcass, and buffing of that shoulder is accomplished. Then the rasp is moved so it can work on the other shoulder of the tire casing to buff, and thus final buffing steps occur.

Other known devices are configured so that a rotating casing can be articulated and moved into contact with a rotating rasp. See, e.g., U.S. Pat. No. 3,877,506. In either case, however, a number of movements are required to complete the buffing operation and to establish the desired crown radius and shoulder radius. Moreover, the rasp and/or tire must be repeatedly adjusted so that the orientation of the particular component results in formation of the desired radii. The procedures are especially pronounced if a compound radius system is to be used.

Various devices have been proposed to overcome these deficiencies. For example, use of a tire profile template for the particular size and shape of the casing to be retreaded is proposed in the aforementioned U.S. Pat. No. 4,116,256. In this device, the template engages a guide surface, which normally lies in a plane that is tangential to the surfaces of the cutting wheels. The template is shifted axially of the cutting wheels as necessary, to enable the texturizing wheels to finish the shoulder areas of the casing. However, the use of templates is undesirable because different templates are needed for each different tire size or desired tire profile. Preparation, storage and use of different templates is expensive and cumbersome.

Alternatively, a buffing apparatus mounted for movement in an arcuate path generally parallel to the axis of rotation is shown in the aforementioned U.S. Pat. No. 3,867,792. The buffer guide shown in that patent consists of a rigid arcuate plate forming a concave surface facing the tire mounting unit and rollers adapted to roll along the surface. This complex structure is expensive to manufacture and difficult to use.

While these devices have overcome some of the deficiencies in the prior art, there is still a long felt need for a buffing device which is easy to use and which is less complex than those discussed above.

SUMMARY OF THE INVENTION

The present invention involves a buffing apparatus which enables faster and more uniform buffing of tire casings prior to application of replacement treads. The apparatus is particularly useful in preparing tire casings for receiving contoured treads having compound radii, i.e., a crown radius and shoulder radii. How the present invention provides these benefits will become apparent shortly as the preferred embodiment thereof is described in connection with the figures. Generally, however, the benefits are provided by mounting a rasping or buffing element in a manner which allows a compound radius to be formed in the shoulder of the tire casing without removing the rasp from the surface of the tire casing during the buffing operation.

In particular, a buffing apparatus for preparing a tire casing for retreading includes a tire casing rotating assembly. This assembly includes a system for mounting the casing in a vertical plane and rotating for the tire casing about a horizontal axis. The apparatus also includes a pedestal movable toward and away from the rotating tire casing. The pedestal is pivotable about the central axis of the pedestal and is also generally rotatable over a predetermined arc about a vertical axis spaced from the central axis of the pedestal. The apparatus also includes a rotatably driven rasp which is mounted on the pedestal and which is adapted to contact the rotating tire casing. The rasp is mounted rearwardly and offset from the central axis of the pedestal.

The buffing apparatus also includes a monitor, which preferably comprises first and second laser lights suitably positioned to direct a beam of light on each edge of the rotating casing.

Also provided is a rasp assembly for use in a tire buffing apparatus where a rotating casing is processed to obtain a buffed tire casing having a predetermined crown arc radius and predetermined shoulder radii. The rasp assembly comprises a stand generally disposed about a first vertical axis. The stand carries a rasp. The stand is generally rotatable in a first predetermined arc about a first vertical axis. The first arc generally corresponds to the shoulder radii. The stand is further generally rotatable in a second predetermined arc about a second vertical axis. The second predetermined arc generally corresponds to the crown arc radius. The rasp is mounted on the stand offset from the first vertical axis.

BRIEF DESCRIPTION OF THE DRAWINGS

The preferred exemplary embodiment of the invention will be hereinafter described in conjunction with the appended drawings, wherein like designations denote like elements, and.

DETAILED DESCRIPTION OF THE PREFERRED EXEMPLARY EMBODIMENTS

Figure 1:
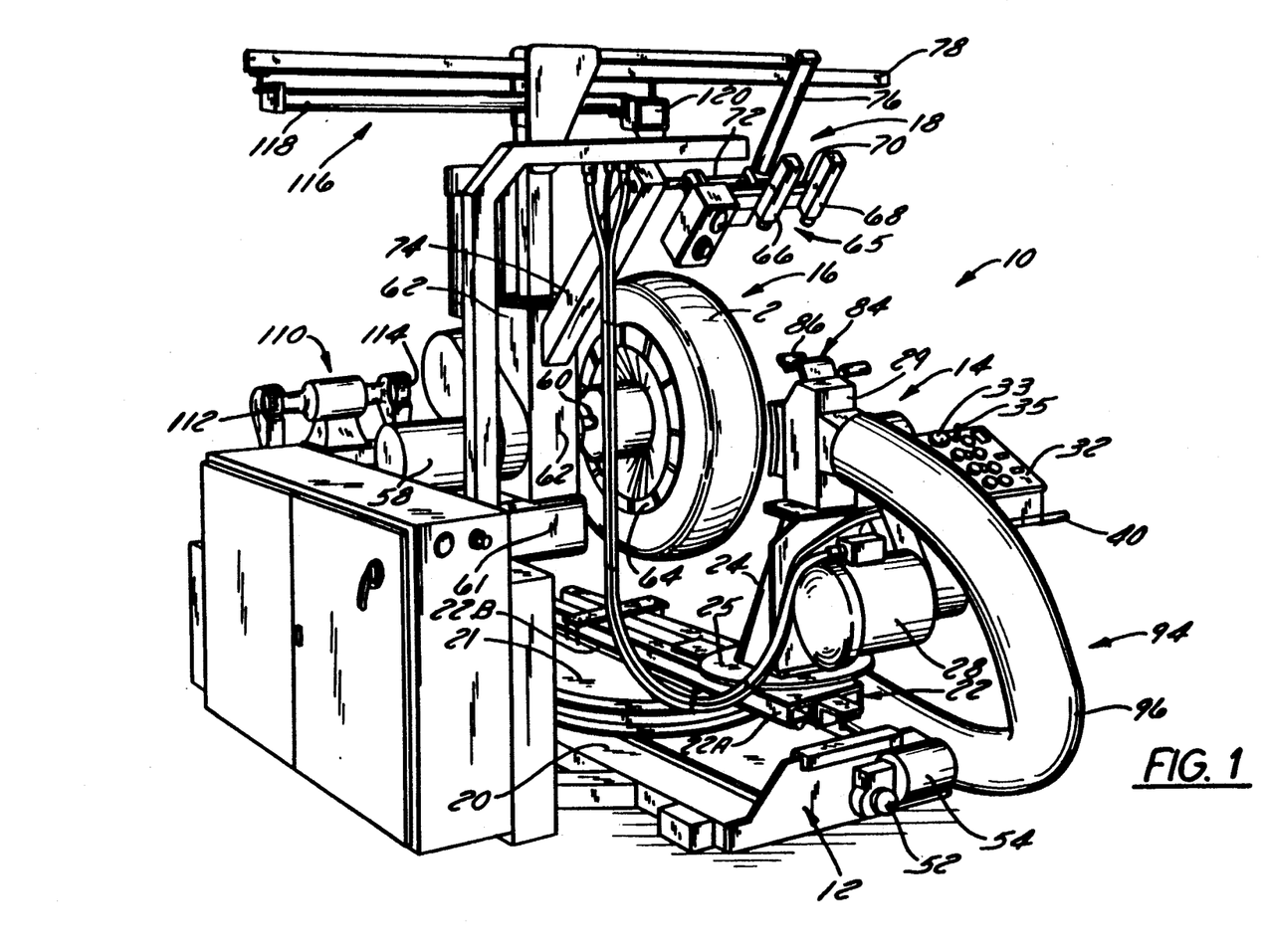
FIG. 1 is a perspective view of the buffing apparatus embodying the invention.
Figure 6:
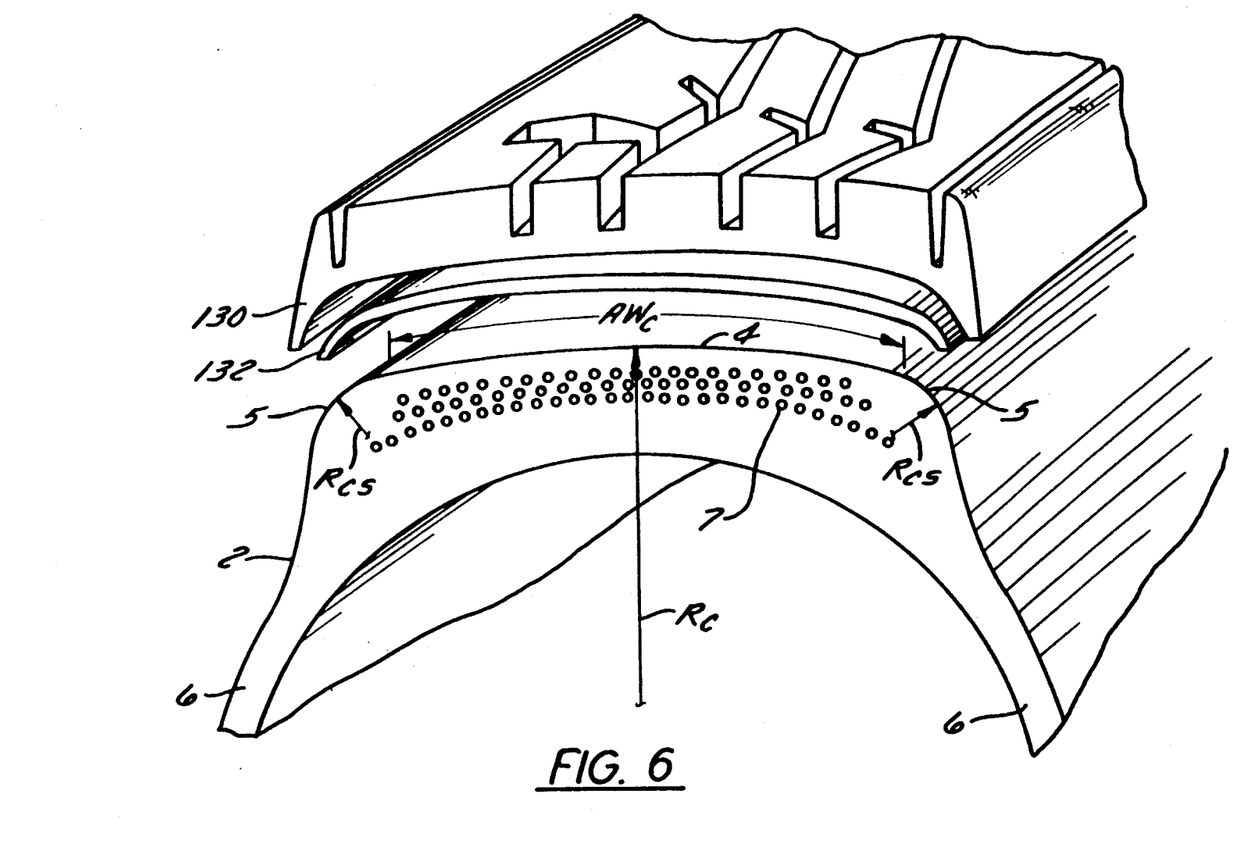
FIG. 6 is a cross-sectional view of a tire casing illustrating radii which determine the profile of the tire casing processed with the apparatus according to the invention and a replacement tread suitably configured to be placed thereon; and, FIG. 7 is a simplified fragmentary partial view illustrating the position of the rasp as it is swung by the apparatus according to the invention for texturizing and/or preparing the casing surface.

A tire buffing apparatus 10 according to the invention generally is shown in FIG. 1. With reference to FIG. 6, a tire casing 2 which can be buffed using apparatus 10 according to the invention is shown and includes a crown portion 4 bounded on either side by respective shoulder portions 5 and respective side walls 6. Casing 2 also includes a belt package 7 underlying crown 4. Crown 4 and shoulders 5 of casing 2 manifest a predetermined configuration suitably formed by buffing using apparatus 10.

In particular, the surface of crown 4 of casing 2 is mechanically buffed to provide a textured, convex arcuate configuration in a direction transverse to the circumference of casing 2. Specifically, the arc has a characteristic radius of curvature, $R_c$, generally corresponding to the upper contour of belt package 7, extending above the top belt by a predetermined thickness, such as 3/32 of an inch. The length of the arc at the crown radius extending between respective shoulders 5 defining crown 4, denominated crown arc width $AW_c$, is also set at a predetermined value. $R_c$ and $AW_c$ are characteristic to casings of particular models or sizes of tires. The casing from each variety of new tire has a characteristic crown radius and crown arc width.

Shoulders 5 of casing 2 are also contoured in the shape of convex arcs having a predetermined buffed shoulder radius $R_{cs}$, substantially less than the crown radius $R_c$. For casings having a buffed crown radii of from about 20 to about 32 inches, radius $R_{cs}$ is suitably in the range of about 0.3125 to about 1.625 inches. A typical example of $R_{CS}$ would be about 1.00 inch.

Crown radius $R_c$ of the buffed casing is a characteristic of the particular tire from which the casing 2 derives and varies from tire to tire. However, a common predetermined crown arc width $AW_c$ can be accommodated by casings derived from a variety of sizes of new tires, notwithstanding different crown radii, particularly when the shoulder of the casing is formed as a convex arc in the manner of respective shoulders 5. Casing crown arc width $AW_c$ is normally chosen to approximate the tread width of the new tire from which casing 2 derives. In practice, to approximate the tread widths of a range of tires, the crown arc width $AW_c$ is preferably chosen as a median new tire tread width for tires in a series from which casing 2 derives.

According to a preferred embodiment of the present invention, crown radius $R_c$ of casing 2 is preferably in the range of about 20 to about 32 inches. However, larger crown radii, say up to about 52 inches, may be buffed using apparatus 10 according to the invention. However, for tires having a crown radius $R_c$ in the preferred range, the crown arc width $AW_c$ is normally in the range of about 7.9 to about 9.8 inches.

Figure 2:
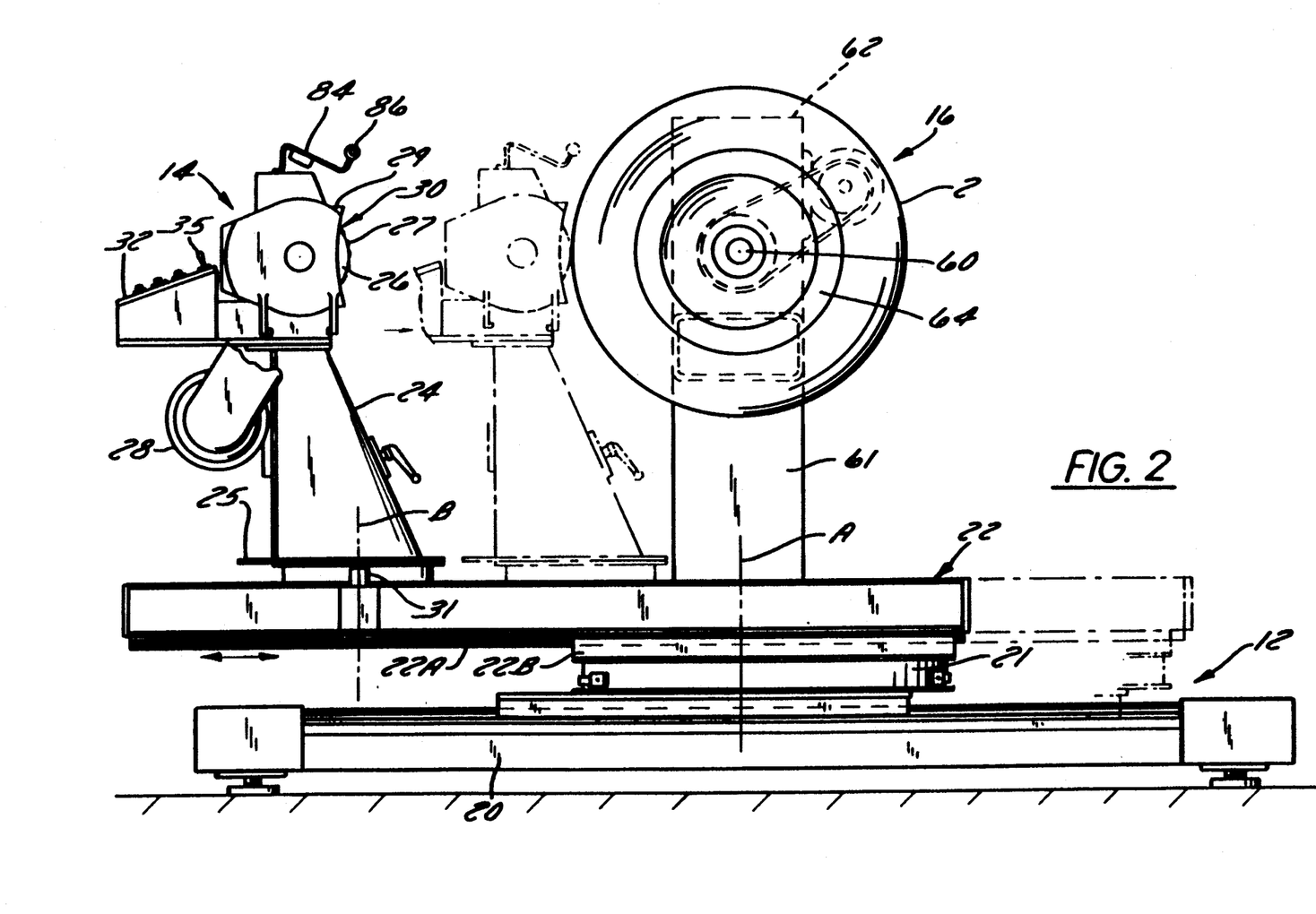
FIG. 2 is a side view of the apparatus shown in FIG. 1.

As best seen in FIGS. 1 and 2, apparatus 10 includes a frame 12, a rasp assembly 14, a tire rotating assembly 16 and a monitoring assembly 18. Frame 12 preferably includes a base 20, an arcuate guide frame 21, and a slide frame 22. Arcuate guide frame 21 preferably comprises a circular track about which rasp assembly 14 and slide frame 22 can rotate. According to a preferred embodiment of the invention, rasp assembly 14 is rotatable about the central axis A of frame 21 to form a predetermined, preset buff radius on the tire casing. This radius varies depending on the make and size of the casing to be buffed.

In accordance with a preferred embodiment of the invention, the buff radius is obtained by movement of rasp assembly 14 with respect to guide frame 21. In particular, with reference to FIG. 1, the upper portion 22A of slide frame 22 is movable with respect to the lower portion 22B of slide frame 22 through use of an electric screw actuator such as a worm screw assembly (not shown) to obtain the preset buff radius.

Rasp assembly 14 is also movable toward and away from tire rotating assembly 16 along slide frame 22. This movement of rasp assembly 14 toward or away from the rotating assembly is preferably separate from the movement of portions 22A and 22B of slide frame 22 to obtain the preset buff radius. In accordance with a preferred embodiment of the invention, movement of rasp assembly 14 toward and away from tire rotating assembly 16 is effected through use of a worm screw 52 mounted within frame 12 driven in a conventional manner by a motor 54 suitably attached to frame 12. As shown best in FIGS. 1 and 2, slide frame 22 is suitably configured to receive the lower portion of rasp assembly 14.

As will be explained more fully below, rasp assembly 14 is also pivotal about its central vertical axis B. Each of the movements of rasp assembly 14 may be motorized such that they can be easily accomplished by an operator of apparatus 10. Preferably, pivoting of rasp assembly 14 about axis B is not motorized.

Figures 3, 4:
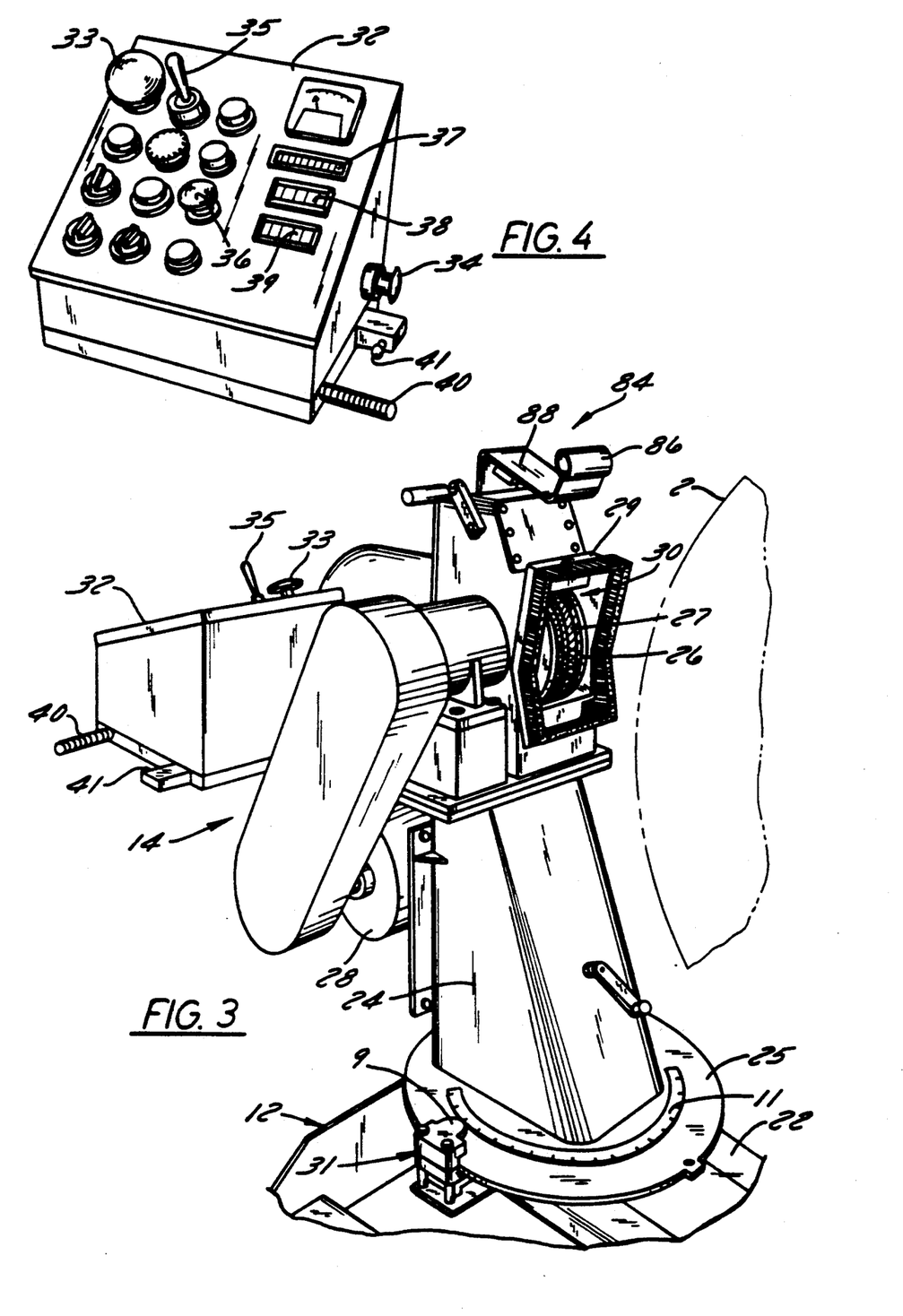
FIG. 3 is a perspective view of the rasping element and rasp pedestal of the apparatus shown in FIG. 1.
FIG. 4 is a perspective view of a control panel of the apparatus shown in FIG. 1.

As shown in FIGS. 1 to 3, rasp assembly 14 includes a pedestal 24, an arcuate base plate 25, a rasp head 26, and a drive motor 28. Pedestal 24 is suitably mounted to base plate 25, which in turn is mounted to frame 12. Pedestal 24 is suitably constructed to carry rasp head 26 and drive motor 28. Rasp head 26 preferably includes an abrasive serrated edge 27 which is of a conventional configuration. Preferably, edge 27 includes a plurality of linearly disposed rasp blades.

With continued reference to FIG. 3, it can be seen that rasp head 26 is located in a housing 29 having an open aperture 30 permitting abrasive edge 27 to contact tire casing 2 during the buffing operation. Rasp head 26 is mounted for rotation in a conventional manner. Preferably, rasp head 26 is mounted for rotation in a substantially vertical plane about a generally horizontal axis.

Drive motor 28 is operatively connected to rasp head 26. Drive motor 28 is also of conventional design and is mounted in a conventional fashion, as is shown, on pedestal 24. In accordance with a preferred embodiment of the invention, drive motor 28 is at least a 25 Hp motor.

As discussed briefly above, pedestal 24 is movable forwardly and rearwardly on slide frame 22, such that rasp assembly 14 including rasp head 26 can be moved to obtain a predetermined, preset buff radius corresponding to crown radius $R_c$. This buff radius can vary from about 6 inches to about 38 inches, depending upon the dimensions of casing 2. As is known, pedestal 24, including rasp head 26, is movable about this buff radius from one side, i.e., one shoulder 5 of tire casing 2, to the other side, i.e., the other shoulder 5, of tire casing 2. Such movement is effected by movement of rasp assembly 14 and slide frame 22 about guide frame 21. This rotation is about vertical axis A spaced from the pedestal itself.

Pedestal 24 is also rotatable about that predetermined, preset buff radius corresponding to shoulder radius $R_{cs}$. This rotation is preferably about vertical axis B of pedestal 24. In a preferred embodiment of the invention, pedestal 24 is held in a substantially oriented position with respect to slide frame 22 by a set pin assembly 31 which extends through suitable apertures in arcuate base plate 25 and slide frame 22. In operation, pin assembly 31 is released, preferably electro-mechanically, to facilitate relatively free movement of pedestal 24 about vertical axis B. As shown best in FIG. 3, pin assembly 31 may also include an indicator 9 which interacts with an arcuate gauge 11 to indicate the relative angular position of pedestal 24 with respect to slide frame 22. Arcuate gauge 11 preferably includes marks indicative of angular position.

Figure 7:
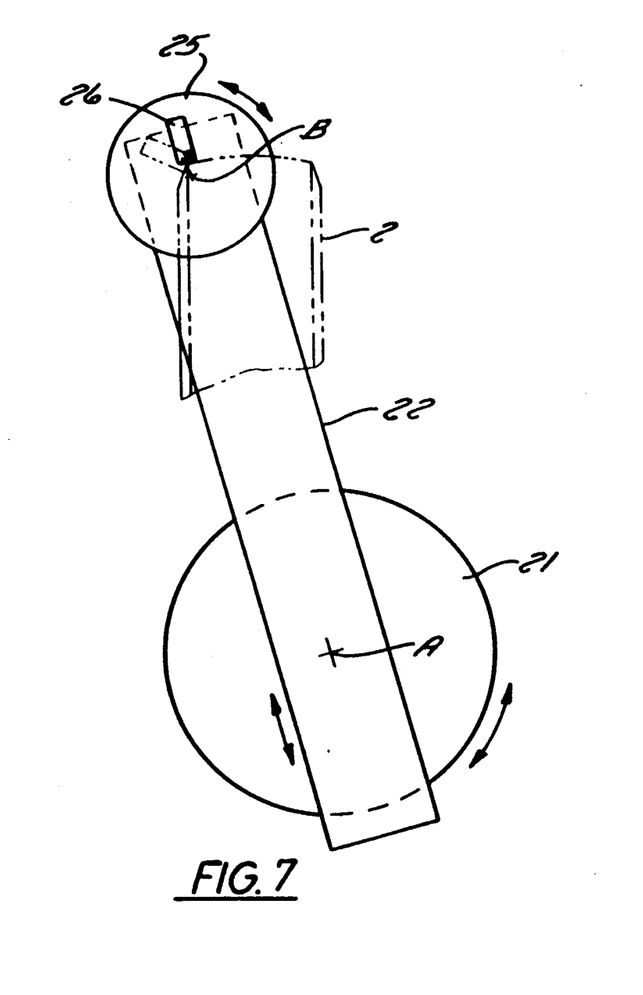

With reference to FIGS. 1, 2 and 7, it can be seen that the vertical axis A of the buff radius is displaced from the vertical axis B, i.e., centerline, of pedestal 24. Vertical axis A generally corresponds to the axis of tire rotating assembly 16 and the axis (centerline) of arcuate guide frame 21. Vertical axis B, on the other hand, generally corresponds to the centerline of rasp assembly 14.

With continued reference to FIGS. 2 and 7 it can be seen that according to the present invention rasp head 26 is rearwardly offset from axis B, the axis of rotation of pedestal 24. According to a preferred embodiment of the invention, rasping element 26 is mounted to pedestal 24 such that it is from about 0.75 to about 1.75 inches from the centerline pivot B of pedestal 24, and more preferably from about 1.00 to 1.50 inches. In general, the amount of offset is determined by the predetermined desired shoulder radius $R_{cs}$ of tire casing 2. Thus, for a typical $R_{cs}$ of 1.00 inches, rasp head 26 is offset about 1.00 inch.

A control panel 32 is also operatively attached to pedestal 24 and one embodiment is shown in greater detail in FIG. 4. Control panel 32 includes the necessary manual controls for operating tire buffing apparatus 10. Moreover, control panel 32 ensures that such essential controls of the machine are in ready reach of an operator standing at the front of the machine. The electro-pneumatic machine controls are conventional, and thus the necessary electrical and electronic circuitry associated with the controls has not been shown, since the invention is particularly concerned with the mechanical components of the tire buffing apparatus 10 according to the invention. It is sufficient to explain that control panel 32 has a tire drive on and off switch 33 which activates tire rotating assembly 16. Control panel 32 also includes a start and stop push button 34 for rasp drive motor 28 and a forward and reverse joystick 35 for moving the rasp assembly 14 forward and backward about slide frame 22. An inflate and deflate push button 36 controls the admission and exhaustion of inflation air through an inflation shaft (not shown). Control panel 32 further includes a plurality of digital readouts for the tire circumference 37, buff radius 38 and the rasp angle 39.

A handle 40 is located adjacent control panel 32 and permits the operator to guide the rasp head 26 to buff casing 2. A release button 41 is located proximate to handle 40 and when depressed permits pedestal 24 to be rotated about vertical axis B. In particular, when button 41 is depressed, pin assembly 31 is released and pedestal is free to rotate with respect to slide frame 22.

Figure 5:
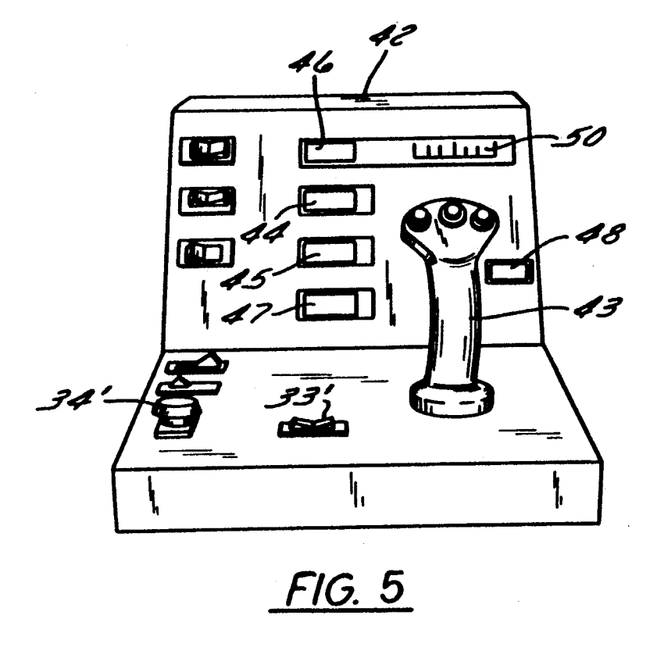
FIG. 5 is a perspective view of an alternative form of a control panel of the apparatus according to the invention.

With reference to FIG. 5, an alternative control panel 42 is shown. In accordance with this embodiment of the invention, control panel 42 includes a joystick 43 which facilitates multiple movements of rasp assembly 14 - of course through use of the appropriate circuitry and controls, as is known by those skilled in the art. In particular, joystick 43 facilitates forward and reverse movement of rasp assembly 14. Joystick 43 also permits pedestal 24 and thus rasp assembly 14 to be rotated from side to side across crown 4 of casing 2 in accordance with the predetermined radius $R_c$. Joystick 43 further permits pedestal 24 to be rotated about pedestal axis B.

Control panel 42, like control panel 32, includes tire drive on and off 33' and a start and stop button 34'. Control panel 42 also includes a buffed radius digital readout 44, a tire circumference digital readout 45, a laser width digital readout 46, a rasp angle digital readout 47, a depth of rasp digital readout 48, and an edge indicator readout 50. Edge indicator readout 50 preferably cooperates with monitoring assembly 18 to provide a visual readout on control panel 42 of the position of rasp head 26 relative to casing 2. The interaction or relationship of monitoring assembly 18 and edge indicator 50 will be described in greater detail below.

With reference to FIGS. 1 and 2, tire rotating assembly 16 preferably includes a rotating shaft 60 suitably journaled on a stationary beam 61 which is in turn attached to frame 12. Preferably, a drive motor 58, a housing 62 enclosing a transmission drives shaft 60. Housing 62 also encloses controls, electrical elements and the like, all of conventional design. In accordance with a preferred embodiment of the invention, drive motor 58, which drives shaft 60, is a variable speed drive motor. The necessary circuitry associated with such controls and electrical elements has not been shown or described in detail because, in and of themselves they do not relate to the present invention.

An expansible mandrel mechanism 64 is suitably mounted for rotation on shaft 60. Expansible mandrel mechanism (rim) 64 permits tires of different diameters to be held for buffing. For example, pneumatic truck tires (LT or LB) in the range of about 13 inches through about 25 inches suitably may be buffed on apparatus 10 according to the present invention. Shaft 60 preferably is horizontally oriented with respect to frame 12. Rim 64 preferably extends in a vertical plane from shaft 60. Accordingly, tire casing 2 is rotated in a substantially vertical plane about a horizontal axis commensurate with shaft 60.

With reference to FIG. 1 monitoring assembly 18 includes a laser shoulder trim guide lighting system 65. System 65 preferably includes respective first and second laser lights 66 and 68. Laser lights 66 and 68 are movably attached to a beam 70. Beam 70 is attached to a spindle 72, which in turn is attached to an angularly oriented arm 74 of housing 62 of tire rotating assembly 16. Additionally, a support 76 is attached at one end to spindle 72 and at another end to a cross beam 78. Cross beam 78 is suitably attached, as shown best in FIG. 1, to an upper extension of housing 62 of tire rotating assembly 16.

Preferably, laser lights 66 and 68 are controlled by suitable electronic components, such as electronic motors, which enable the distance between lights 66 and 68, and thus the light beams generated by the lights, defined herein as the laser width, to be adjusted. Preferably, this adjustment is effected from the control panel, for example, by a suitable control.

Laser lights 66 and 68 preferably are constructed such that the line (beam) illuminated on rotating tire casing 2 is colored and is readily observable by an operator of apparatus 10. In accordance with the preferred embodiment of the invention, laser lights 66 and 68 produce a red colored beam which is easily observable when that beam shines on casing 2.

A suitable detection device 84 is preferably mounted above rasp head 26 such that laser lights 66 and 68 shine not only on casing 2 but also on detection device 84 as rasp head 26 is moved to buff casing 2. In accordance with a preferred embodiment of the invention, as shown best in FIG. 3, detection device 84 includes a cylindrical detector 86 attached to an angled or S-shaped support 88. The beams from laser lights 66 and 68 shine on detector 86, which preferably is calibrated such that the predetermined crown arc width $AW_c$ of buffed tire casing 2 is obtained as rasp head 26 is moved to that calibrated spot.

Alternatively, calibrated detector 86 of detection device 84 can be replaced with a fiber optics ribbon network. In accordance with this aspect of the invention, support 88 is provided with a fiber optics ribbon at the outermost edge in place of detector 86. This ribbon detector is particularly suited for use with alternate control panel 42 in FIG. 5. In accordance with this embodiment of the invention, a fiber optics ribbon, preferably including from about 16 to about 250 strands per inch, is carried by support 88. One end of the ribbon is at the outermost point of support 88 (i.e. in place of detector 86) and the other end is passed through to edge indicator display 50 on control panel 42. In particular, the ribbon is suitably housed in support 88 such that as laser lights 66 and 68 shine on support 88, the light beam is received by the ribbon. The position of rasping element 26 is thus readily observable because one end of the ribbon forms the incremental display of edge readout 50 on display panel 42. As rasping element 26 is moved from one edge of casing 2 to the other, i.e., from one shoulder 5 to the other shoulder 5, during a buffing operation, the position of rasp head 26 with respect to tire casing 2 is visually displayed to the operator on readout 50.

Tire buffing apparatus 10 optionally may be provided with a number of other accessories. For example, with reference to FIG. 1, it can be seen that a dust collection assembly 94 optionally may be attached to rasp assembly 14. Dust collection assembly 94 preferably includes flexible conduit 96 which is mounted to the rear of rasp head housing 29. Conduit 96 is preferably formed of a flexible polymeric material and is attached such that the particles of rubber which are ground off the tread portion of casing 2 by means of rasp head 26 can be collected and sucked into a suitable collection chamber (not shown). Thus, objectionable rubber particles do not escape into the work area where apparatus 10 is operated.

With continued reference to FIG. 1, a swing arm buffer attachment 110 also optionally may be attached to frame 12 such that it can be moved into contact with rotating tire casing 2 to buff (trim) the sidewalls of rotating tire casing 2. Buffer attachment 110 preferably includes a pair of miniature rasps or wire brushes 112 and 114. If utilized, the operator may conveniently move buffing attachment 110 into contact with the sidewalls 6 of casing 2 when necessary, yet during the buffing operation described above keep attachment 110 conveniently out of the way.

Additionally, buffing apparatus 10 optionally may be provided with an automatic lift system 116. As shown best in FIGS. 1 and 2, system 116 includes an extendable column 118 fixed to cross beam 78 which may be moved outwardly to pick up and place a tire casing to be buffed on apparatus 10. A tire grabbing assembly 120 is suitably attached to extendable column 118, and in operation can be raised and lowered through operation of a suitable control on control panel 32 or control panel 42 to engage a tire casing. Once engaged, assembly 120 and extendable column 118 are used to permit easy application of tire casing 2 to expansible mandrel mechanism 64.

In operation of apparatus 10 according to the invention, rasp assembly 14 is moved with respect to guide frame 21 to set the predetermined buff radius $R_c$. This movement is effected by movement of upper portion 22A of slide frame 22 with respect to arcuate guide frame 21, such as through use of conventional electric screw actuator. Preferably this movement is automated and is accomplished through use of an appropriate control on control panel 32 or control panel 42. Thereafter, rasp assembly 14 is moved into contact with rotating casing 2. This movement is preferably effected by moving rasp assembly 14 along slide frame 22, such as is shown best in FIG. 2, with the phantom lines showing the position of rasp assembly 14 in operative buffing contact with casing 2.

Once operative contact between rasp head 26 and casing 2 is achieved, rasp assembly 14 is moved from shoulder to shoulder across the surface of tire casing 2 generally about axis A and in accordance with predetermined buffed tire crown radius $R_c$. In particular, rasp assembly 14 and slide frame 22 are guided along arcuate guide frame 21 from one edge, i.e., shoulder 5, to the other edge, i.e., other shoulder 5, until the predetermined amount of worn tread is removed by action of rasp head 26.

Once a suitable amount of tread has been removed from crown 4 of casing 2, rasp pedestal 24 is pivoted to buff shoulders 5 of tire casing 2 to the predetermined buffed shoulder radius $R_{cs}$. Preferably, depression of the suitable control, such as release button 41, releases set pin assembly 31 to permit pedestal 24 to rotate about axis B. Because rasp head 26 is offset from the axis B, i.e., the rotation axis of rasp pedestal 24, there is no need to remove the rasp head 26 from the surface of the tire such as is necessary in the prior art buffing machines. Instead, simply allowing rasp pedestal 24 to pivot about axis B, shoulders 5 can be buffed as desired. As a result, the buffing apparatus according to the present invention enables increased productivity and accuracy.

As soon as casing 2 has been rasped to the condition shown in FIG. 6 and any additional repair work needed has been completed, such as shoulder buffing using swing arm buffer 110 or the like, casing 2 can be recapped applying a suitable gum adhesive 132 and replacement tread 130 in accordance with conventional retreading procedures. Preferably, casing 2 is recapped with the contoured replacement tread disclosed in the copending application, U.S. Ser. No. 07/634,421.

It will be understood that, while various specific configurations of the tire buffing apparatus according to the invention have been described herein, they have not been described in a limiting sense and the tire buffing apparatus according to the invention may be suitably configured, as is necessary to accommodate any tire casing. Further, it should be appreciated that the above description is of a preferred exemplary embodiment of the present invention, and the invention is not limited to the specific forms shown. For example, numerous modifications in the precise configuration of the tire buffing apparatus and the relationship between the various elements thereof may be utilized as is known or hereafter devised by those of ordinary skill in the art. Such modifications may be made in the design arrangement of the elements within the scope of the invention, as is expressed in the claims appended hereto.

I claim:

1. A buffing apparatus for grinding the crown of a tire casing along a first radius and the shoulder of the casing along a second radius smaller than the first radius, the apparatus comprising:

means for mounting a tire casing and rotating said tire casing in a plane perpendicular to the casing axis;

an elongate, slide frame arranged in one position to lie along an axis which is in the plane defined by the rotating tire casing, the slide frame including a first slide component moveable toward and away from the mounting and rotating means;

a pedestal mounted generally perpendicularly to the first slide component, the pedestal having a first axis which is perpendicular to the first slide component, and the pedestal being rotatable about the first axis;

a rasp mounted on the pedestal and having a surface arranged to contact the tire casing, the surface being spaced apart from the first axis so that the first axis is intermediate the surface and the mounting and rotating means for rotating the pedestal about the first axis during grinding of the shoulder along the second radius; and rotating means for rotating the slide frame about a second axis spaced apart from the first axis during grinding of the crown along the first radius.

2. The apparatus of claim 1 further comprising an arcuate guide frame mounted to the slide frame, the guide frame defining a second predetermined arc for rotation of the pedestal about the second axis.

3. The apparatus of claim 1 further comprising means for selectively locking the pedestal to the first slide component to prevent rotation of the pedestal about the first axis.

4. The apparatus of claim 1 further comprising a pair of lasers mounted to a laser support fastened to the means for mounting, the lasers directing a beam of light onto opposed edges of said casing.

5. A buffing apparatus for buffing tread from tire casings, said buffing apparatus comprising:

a casing mount including a horizontal shaft, an expandable mandrel rim affixed to said shaft and adapted to receive the casing to be buffed, a motor operatively connected to said shaft to rotate said shaft and to thereby rotate said tire casing in a substantially vertical plane;

a horizontal, elongate slide frame arranged in one position to lie along an axis which is in the plane defined by the rotating tire casing, the slide frame including a first slide component moveable toward and away from the casing mount;

a rasp pedestal mounted generally perpendicularly to the first slide component, the pedestal having a first vertical axis and the pedestal being rotatable about the first axis;

the rasp of the pedestal having a surface adapted for operative buffing engagement with the rotating casing, the surface being spaced apart from the first axis so that the first axis is intermediate the surface and the casing mount, rotating means for rotating the pedestal about the first axis while grinding the shoulder of the casing; and rotating means for rotating the slide frame which supports the pedestal about a second axis, spaced apart from the first axis, while grinding the crown of the casing.

6. The apparatus of claim 5 further comprising a pair of laser light generators mounted to a laser support fastened to the casing mount, the lasers directing a laser light beam onto respective edges of the rotating casing and onto a detection device which cooperates with an indicator display to provide a visual indication of the position of the rasp surface with respect to the casing.

* * * * *